United States Patent
Adachi et al.

(10) Patent No.: US 9,851,224 B2
(45) Date of Patent: Dec. 26, 2017

(54) DISPLACEMENT MEASURING DEVICE AND DISPLACEMENT MEASURING METHOD

(71) Applicant: MITUTOYO CORPORATION, Kanagawa (JP)

(72) Inventors: Satoshi Adachi, Kanagawa (JP); Youhei Toku, Kanagawa (JP); Toshihiro Hasegawa, Saitama (JP)

(73) Assignee: MITUTOYO CORPORATION, Kanagawa (JP)

( * ) Notice: Subject to any disclaimer, the term of this patent is extended or adjusted under 35 U.S.C. 154(b) by 181 days.

(21) Appl. No.: 14/990,937

(22) Filed: Jan. 8, 2016

(65) Prior Publication Data

US 2016/0209242 A1 Jul. 21, 2016

(30) Foreign Application Priority Data

Jan. 19, 2015 (JP) .................. 2015-007660

(51) Int. Cl.
*G01D 5/24* (2006.01)
*G01D 5/244* (2006.01)
*G01D 5/241* (2006.01)

(52) U.S. Cl.
CPC ....... *G01D 5/24419* (2013.01); *G01D 5/2415* (2013.01)

(58) Field of Classification Search
USPC ................................. 324/660–663
See application file for complete search history.

(56) References Cited

U.S. PATENT DOCUMENTS

| 4,420,754 A | * | 12/1983 | Andermo | ............. | G01D 5/2415 |
| | | | | | 324/660 |
| 5,391,992 A | | 2/1995 | Adachi | | |
| 5,440,501 A | * | 8/1995 | Shimomura | ......... | G01D 5/2415 |
| | | | | | 324/662 |
| 2009/0190789 A1 | * | 7/2009 | Liitola | .................. | H04R 3/002 |
| | | | | | 381/387 |

FOREIGN PATENT DOCUMENTS

| JP | H06-64100 B | 8/1994 |
| JP | 2738996 B | 4/1998 |
| JP | 2878913 B | 4/1999 |
| JP | 2909338 B | 6/1999 |

* cited by examiner

*Primary Examiner* — Vincent Q Nguyen
(74) *Attorney, Agent, or Firm* — Greenblum & Bernstein, P.L.C.

(57) ABSTRACT

A phase detector includes a sampling signal generator configured to generate a sampling signal at an edge of a scale signal, a counter configured to count up a count value according to a clock pulse every certain time and to output the count value at a timing instructed by the sampling signal, an edge polarity determinator configured to determine whether an edge polarity of the scale signal is a rising edge or a falling edge and to generate an adjustment signal when the polarity of the edge where the sampling signal is generated is a falling edge and an adjuster configured to add a predetermined adjustment amount to the count value output from the counter when receiving the adjustment signal.

4 Claims, 20 Drawing Sheets

Fig. 10

DISPLACEMENT MEASURING DEVICE AND DISPLACEMENT MEASURING METHOD

INCORPORATION BY REFERENCE

This application is based upon and claims the benefit of priority from Japanese patent application No. 2015-007660, filed on Jan. 19, 2015, the disclosure of which is incorporated herein in its entirety by reference.

BACKGROUND OF THE INVENTION

1. Field of the Invention

The present invention relates to a displacement measuring device and a displacement measuring method. Specifically, the present invention relates to a technique for measuring relative displacement of a movable element to a fixed element based on a detection signal which varies according to the relative displacement.

2. Description of Related Art

There have been known a displacement measuring device which detects displacement of a movable element to a fixed element, which is called an encoder (for example, JPH06-064100B, JP2909338B, JP2878913B, and JP2738996B). Encoders have been used for displacement detectors of small measuring devices, such as digital vernier calipers, digital micrometers, and digital indicators, and widely utilized to position moving tables or the like.

Encoders are, for example, optical encoders, capacitive encoders, and magnetic encoders. A capacitive encoder will be exemplified. Note that, an optical encoder and a magnetic encoder are essentially the same as a capacitive encoder in detection principle. A capacitive encoder includes a main scale and a detection head, which is relatively movable to the main scale and detects relative displacement to the main scale. Generally, the main scale is a fixed element and the detection head is a movable element, but they may be reversed. A number of electrodes are disposed on the main scale and the detection head. A periodic capacity change is generated in electrode patterns according to the relative displacement between the main scale and detection head. By extracting the signal of the periodic capacity change, the displacement is detected.

The periodic signal generated at the electrodes, that is, a phase signal is extracted. The phase signal is extracted as a periodic square wave signal CMP by performing sampling, mixing, low-frequency filtering, or binarizing. The periodic square wave signal CMP has phase information at edges thereof. A phase detection circuit outputs the phase information of the square wave signal CMP as a digital value. For example, if a loop counter counts up according to a clock and the count value is sampled at the timing of edges of the square wave signal CMP, the phase information is thus extracted as a digital value. Then, by comparing the phase information with an electrode arrangement pitch, the phase information is converted into the relative displacement of the detection head. By sampling the phase information as a digital value a predetermined number of times, averaging processing may be performed to reduce display flicker or to cancel offsets of an amplifier or a comparator.

SUMMARY OF THE INVENTION

As described above, when count values are sampled at edges of a square wave signal CMP, phase information can be extracted as a digital value.

However, it is necessary to determine when to sample the count value, say, either at the timing of a rising edge of the square wave signal CMP or at the timing of a falling edge of the square wave signal CMP, but not both.

The periodic square wave signal CMP has the phase information at edges. If the rising edge is, for example, equivalent to 0°, then the falling edge is equivalent to 180°.

If the counter values are sampled without distinguishing the rising edge and the falling edge, the correspondence relation between the counter value and the phase can be shifted.

In the case where a plurality of sampling values are averaged, the edge polarity from which the sampling is started, should be determined to be either a rising edge or a falling edge, but not both.

The problems in this case will be described with reference to FIGS. 19 and 20.

FIG. 19 is a timing chart illustrating the relation between a sample enable signal ENB and a periodic square wave signal CMP.

The sample enable signal ENB rises at a certain period, for example, at an interval of 100 msec, and the sampling of the count value is started by the rising of the sample enable signal ENB.

The periodic square wave signal CMP holds the phase information according to the relative position between the main scale and the detection head, and repeatedly rises and falls. After the sample enable signal ENB rises, the sampling is started from the rising of the periodic square wave signal CMP, and the count values are sampled at the timing of the edges a predetermined number of times. Here, it is assumed that count value is sampled successively four times and the values are averaged. Thus, after the sample enable signal ENB rises, the sampling signal becomes ON four times at the timing of the edges of the periodic square wave signal CMP from the first rising, and the count value is sampled at the timing when the sampling signal becomes ON.

A waiting time tw is generated after the sample enable signal ENB rises and until the first rising of the periodic square wave signal CMP appears. As illustrated in FIG. 19, after the sample enable signal ENB rises, if the first edge of the periodic square wave signal CMP is a rising edge, the waiting time tw does not exceed a half period of the periodic square wave signal CMP at most.

However, as illustrated in FIG. 20, after the sample enable signal ENB rises, if the first signal of the periodic square wave signal CMP is a falling edge, the waiting time tw exceeds a half period of the periodic square wave signal CMP at least. In the worst case, the waiting time tw might elongate about a period of the periodic square wave signal CMP. If the waiting time tw is long, the power is wastefully consumed for the time, and which affects a life of a battery in the case of a small measuring device driven by the battery.

If a period of the periodic square wave signal CMP is about 2 msec, it seems that a period of the waiting time (2 msec) does not matter. However, the sample enable signal ENB rises at a short interval of, for example, 100 msec, and wasteful power consumption every 100 msec interval adds up to a large loss.

Furthermore, the circuit operation necessary for the displacement detection is the sampling operation for about 8 msec and a little amount of calculation processing.

Thus, the circuit operation for about 20 msec is performed after the sample enable signal becomes ON, and the circuit operation is scarcely performed and the power consumption is suppressed as much as possible during the time (80 msec or more) until the next sample enable signal ENB becomes ON. That is, the main power consumption is attributable to the length of the waiting time tw, and a displacement measuring device which consumes extremely low power can be implemented if the waiting time tw becomes shorter.

A purpose of the present invention is to provide a displacement measuring device which consumes lower power.

A displacement measuring device of an embodiment of the present invention includes:
a main scale;
a detection head provided so as to be relatively displaceable to the main scale and configured to output a periodic signal having a phase to be changed according to relative displacement to the main scale;
a demodulator configured to demodulate the periodic signal into a rectangular wave scale signal having phase information at an edge; and
a phase detector configured to detect the phase information of the scale signal at a timing of the edge, in which
the phase detector includes:
a sampling signal generator configured to generate a sampling signal at the timing of the edge of the scale signal;
a counter configured to count up a count value according to a clock pulse every certain time and to output the count value at a timing instructed by the sampling signal;
an edge polarity determinator configured to determine whether a polarity of the edge of the scale signal is a rising edge or a falling edge and to generate an adjustment signal when the edge, from which the sampling signal is generated, is the falling edge; and
an adjuster configured to add a predetermined adjustment amount to the count value output from the counter when receiving the adjustment signal.

The displacement measuring device of the embodiment of the present invention further includes:
an average calculation executor configured to calculate an average of k number of sampling values, in which
the counter synchronizes with a reference signal and is a loop counter in which k/2 periods of the reference signal is a cycle of the count value,
the sampling signal generator generates the sampling signal successively k times at the timing of the edge of the scale signal after sampling becomes enable, the edge polarity determinator generates the adjustment signal after the sampling becomes enable and when a first edge of the scale signal is the falling edge, and
the adjuster adds a value equivalent to 1/k of a cycle of the counter to the count value output from the counter as an adjustment amount, where k is a natural number.

The displacement measuring device of the embodiment of the present invention further includes:
an average calculation executor configured to calculate an average of k number of sampling values, in which the counter synchronizes with a reference signal and is a loop counter in which $(k+\alpha)/2$ periods of the reference signal is a cycle of the count value,
the sampling signal generator generates the sampling signal successively k times at the timing of the edge of the scale signal after sampling becomes enable,
the edge polarity determinator generates the adjustment signal after the sampling becomes enable and when a first edge of the scale signal is the falling edge, and
the adjuster adds a value equivalent to $1/(k+\alpha)$ of a cycle of the counter to the count value output from the counter as an adjustment amount, where k and $\alpha$ are natural numbers.

In the embodiment of the present invention,
a rising edge may be replaced with a falling edge, and
a falling edge may be replaced with a rising edge.

A displacement measuring method of an embodiment of the present invention for a displacement measuring device including a main scale, a detection head provided so as to be relatively displaceable to the main scale and configured to output a periodic signal having a phase to be changed according to relative displacement to the main scale, a demodulator configured to demodulate the periodic signal into a rectangular wave scale signal having phase information at an edge, and a phase detector configured to detect the phase information of the scale signal at a timing of the edge, the displacement measuring method includes:
counting up a count value according to a clock pulse every certain time;
sampling the count value at the timing of the edge of the scale signal;
determining whether a polarity of the edge of the scale signal is a rising edge or a falling edge; and
adding a predetermined adjustment amount to the sampled count value when the polarity of the edge at the timing when the count value is sampled is the falling edge.

BRIEF DESCRIPTION OF THE DRAWINGS

FIG. 10 is a diagram illustrating a state where a counter counts up.

DETAILED DESCRIPTION

Description of Embodiments

Figure 1:
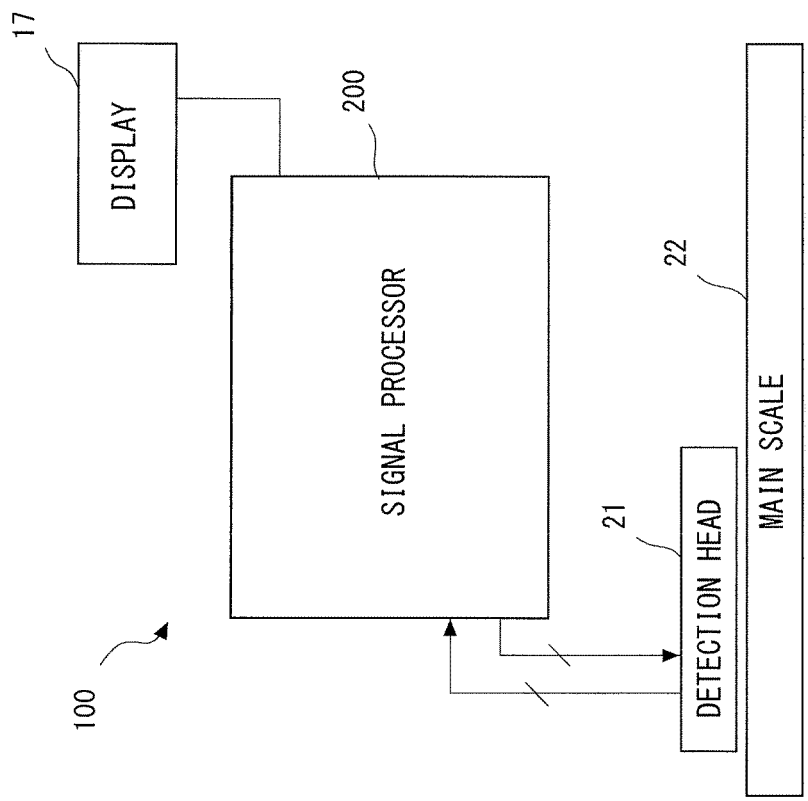
FIG. 1 is a diagram illustrating an entire encoder.

Embodiments of the present invention will be described with reference to the drawings and reference signs assigned to the elements in the drawings.

(First Exemplary Embodiment)

A purpose of the present invention is to shorten a waiting time tw as much as possible when phase information is extracted form a binarized phase signal as a digital value.

Although the point of the present invention is in signal processing, a configuration example of a displacement measuring device (encoder), to which the present invention is suitably applicable, will be described first.

In the present exemplary embodiment, an absolute capacitive encoder will be exemplified as a displacement measuring device (encoder) 100.

FIG. 1 is a diagram illustrating the configuration of the entire encoder 100.

The encoder 100 includes a main scale 22, a detection head 21, a signal processor 200, and a display 17.

The detection head 21 is disposed opposite to the main scale 22 with a slight gap therebetween and provided movably in the longitudinal direction of the main scale 22.

The longitudinal direction of the main scale 22 is a measurement axis x-direction.

The main scale 22 and the detection head 21 each have an electrode pattern for position detection on the surface opposed to each other.

Figure 2:
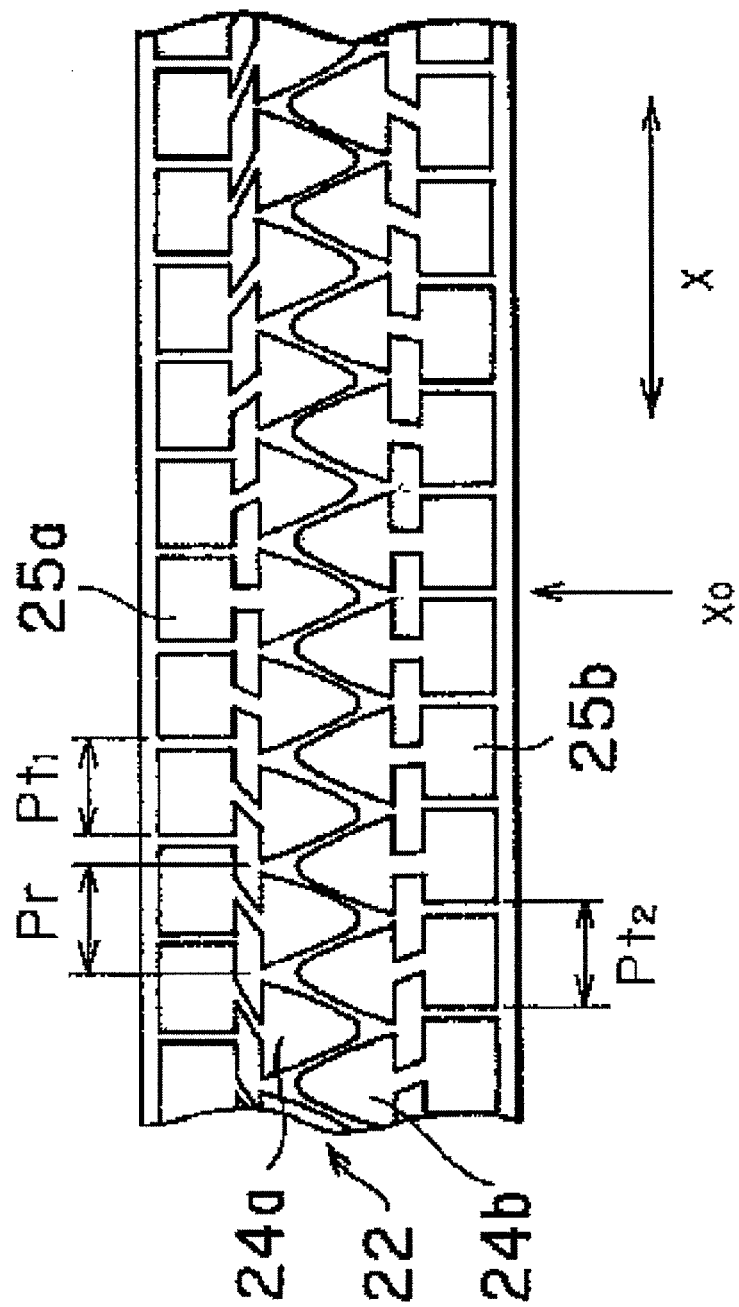
FIG. 2 is a diagram illustrating an electrode pattern provided on a main scale.

FIG. 2 is a diagram illustrating the electrode pattern provided on the main scale 22.

Figure 3:
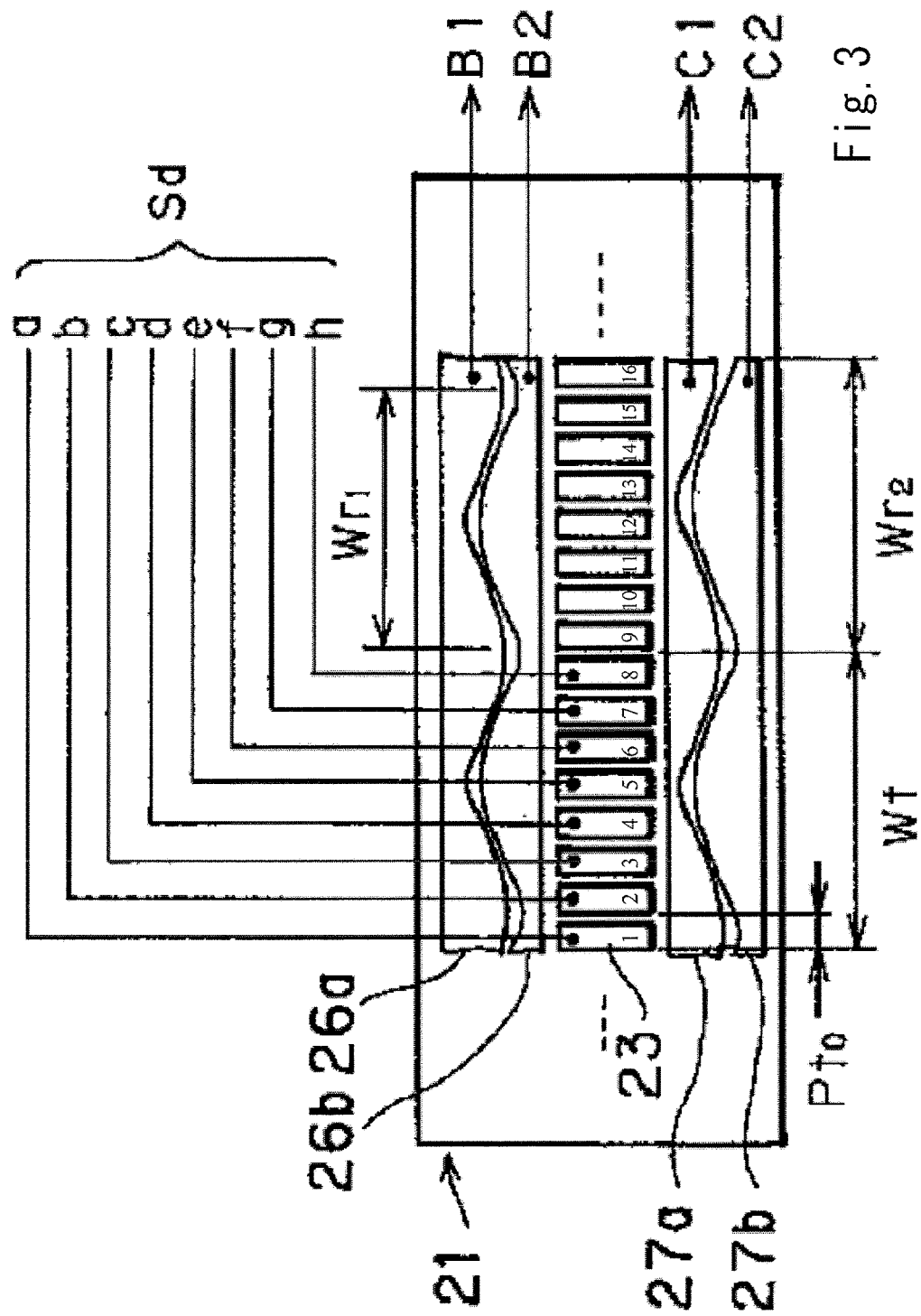
FIG. 3 is a diagram illustrating an electrode pattern provided on a detection head.

FIG. 3 is a diagram illustrating the electrode pattern provided on the detection head 21.

The main scale 22 includes first reception electrodes 24a, second reception electrodes 24b, first transmitter electrodes 25a. and second transmitter electrodes 25b.

In FIG. 2. the first reception electrodes 24a each have a downward triangular shape and are arranged along the longitudinal direction of the main scale 22 at a certain pitch (Pr).

On the other hand, the second reception electrodes 24b each have an upward triangular shape and are arranged along the longitudinal direction of the main scale 22 at the certain pitch (Pr).

The first reception electrodes 24a and the second reception electrodes 24b are disposed so as to engage each other.

The first transmitter electrodes 25a are arranged in parallel with the first reception electrodes 24a. The first transmitter electrode 25a and the first reception electrode 24a are connected one to one. The first transmitter electrodes 25a are disposed along the longitudinal direction of the main scale 22 at a certain pitch (Pt1). On the other hand, the second transmitter electrodes 25b are arranged in parallel with the second reception electrodes 24h. The second transmitter electrode 25b and the second reception electrode 24b are connected one to one. The second transmitter electrodes 25b are disposed along the longitudinal direction of the main scale 22 at a certain pitch (Pt2). The arrangement pitch Pt1 of the first transmitter electrode 25a and the arrangement pitch Pt2 of the second transmitter electrode 25b are different from the arrangement pitch Pr of the reception electrodes 24a and 24b, which will be described later. Note that, it is assumed that Pr>Pt2>Pt1.

Next, the electrode pattern on the detection head 21 side will be described with reference to FIG. 3.

The detection head 21 includes transmission electrodes 23, a first detection electrode 26a, a first detection electrode 26b, a second detection electrode 27a, and a second detection electrode 27b.

The transmission electrodes 23 are arranged along the measurement axis direction at a certain pitch Pt0. The transmission electrode 23 is capacitance-coupled with the first reception electrode 24a and the second reception electrode 24b on the main scale 22 side.

Here, eight transmission electrodes 23 constitute a unit (a group).

In other words, the transmission electrode 23 is connected in common every seven electrodes.

For example, the first transmission electrode 23 is connected in common to the ninth transmission electrode skipping the second to eighth electrodes, and is connected in common with the seventeenth transmission electrode skipping the tenth to the sixteenth electrodes (the following description is omitted as similarly connected.)

In FIG. 3, the numbers are denoted to easily count the number of transmission electrodes.

A drive signal Sd is supplied to the transmission electrode 23. The period signals a to h of eight phases, which are shifted from each other by 45°, are prepared as the drive signal Sd. (The period signals a to h of eight phases are numbered as phase numbers 0 to 7 in phase order.)

Figure 8:
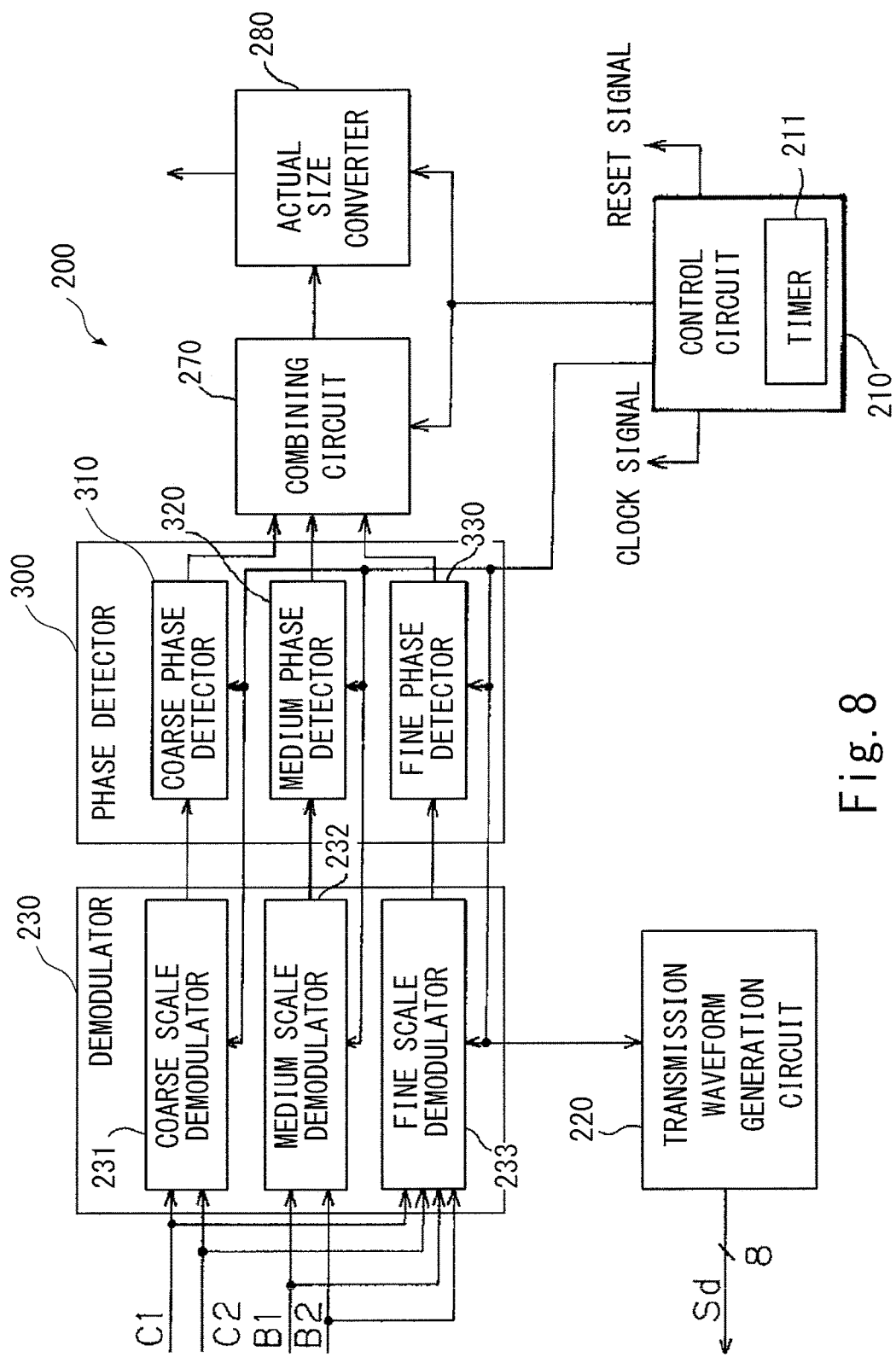
FIG. 8 is a functional block diagram of a signal processor.

Then, the period signals a to h of eight phases, which are shifted from each other by 45°, are respectively supplied to the eight transmission electrodes 23 constituting a group. These drive signals Sd are, more specifically, signals chopped by a high-frequency pulse and generated by a transmission waveform generation circuit 220 (FIG. 8). The time change of the potential of the drive signal Sd is represented as the following expression:

$$Vn = A \sin 2\pi\{(t/T) - (n/8)\}$$

where A represents amplitude of the drive signal Sd, T represents a period of the drive signal Sd, and n represents a phase number (0, 1, 2, ... 7).

When the drive signal Sd is supplied to the transmission electrode 23, an electric field pattern which periodically oscillates in the arrangement direction of the transmission electrode 23 (the measurement axis x-direction) is generated.

A pitch Wt of the periodical electric field pattern is eight time the pitch Pt0 of the transmission electrode 23.

The pitch Wt is set to be N time the pitch Pr of the reception electrodes 24a and 24b. (N is a positive integer.)

It is preferable that N is an odd number, such as 1, 3, or 5, and it is assumed that N=3 in the present exemplary embodiment.

Thus, three or four of the reception electrodes 24a and 24b are constantly capacitance-coupled with the eight continuous transmission electrodes 23. Then, (the phase of) the signal received by the reception electrodes 24a and 24b is to be determined by the combination of the transmission electrode 23 and the reception electrodes 24a and 24b which are capacitance-coupled with each other, but is changed according to the relative position of the detection head 21 to the main scale 22.

The first detection electrodes 26a and 26b are continuous sinusoidal electrodes having a period Wr1 and disposed so as to be capacitance-coupled with the first transmitter electrode 25a on the main scale 22 side. By disposing two sinusoidal electrodes 26a and 26b, which are shifted from each other by a half period, so as to engage each other, a pair of the first detection electrodes 26a and 26b is formed. The relation between the period Wr1 of the first detection electrodes 26a and 26b, and the arrangement pitch Pt1 of the first transmitter electrode 25a will be described later.

The second detection electrodes 27a and 27b are continuous sinusoidal electrodes having a period Wr2 and disposed so as to be capacitance-coupled with the second transmitter electrode 25b on the main scale 22 side. By disposing the two sinusoidal electrodes 27a and 27b which are shifted from each other by a half period so as to engage each other, a pair of the second detection electrodes 27a and 27b is formed. The relation between the period Wr2 of the second detection electrodes 27a and 27b, and the arrangement pitch Pt2 of the second transmitter electrode 25b will be described later.

In the present exemplary embodiment, it is assumed that the encoder is an absolute-type encoder, and three levels of phase changes, such as a coarse period (coarse scale), a medium period (medium scale), and a fine period (fine scale), are detected.

In other words, the pitch Pt1 of the first transmitter electrode 25a and the pitch Pt2 of the second transmitter electrode 25b are slightly different from the pitch Pr of the reception electrodes 24a and 24b, the first transmitter electrode 25a and the second transmitter electrode 25b respectively have an offset D1 and an offset D2 to the reception electrodes 24a and 24b.

The offsets D1 and D2 are respectively represented with the function of the distance x of the measurement direction from the reference position x0 as follows:

$D1(x)=(Pr-Pt1)x/Pr$ $D2(x)=(Pr-Pt2)x/Pr$

By the offsets D1 and D2, when the electric field patterns generated at the first and second reception electrodes 24a and 24b are transmitted to the first and second transmitter electrodes 25a and 25b, the change according to long periods $\lambda 1$ and $\lambda 2$ are added. (It is assumed a long period by the offset D1 is $\lambda 1$, and a long period by the offset D2 is $\lambda 2$.)

Then, it is assumed that the period of the first detection electrodes 26a and 26b, and the period of the second detection electrodes 27a and 27b are, for example, Wr1 (=3Pt1) and Wr2 (=3Pt2) respectively.

The first detection electrodes 26a and 26b, and the second detection electrodes 27a and 27b are capacitance-coupled with three first transmitter electrodes 25a and three second transmitter electrodes 25b, and the capacity change generated in the first transmitter electrode 25a and the second transmitter electrode 25b can be extracted as a detection current.

The transmission electrode 23 is regarded to be capacitance-coupled with the detection electrodes 26a, 26b, 27a, and 27b via the reception electrodes 24a and 24b, and the transmitter electrodes 25a and 25b.

For example, it will be described how the capacity between any one of the transmission electrodes 23 and the other one of the first detection electrodes (26a) is changed according to the position x.

The capacity is represented by Cn(B1).

Figure 4:
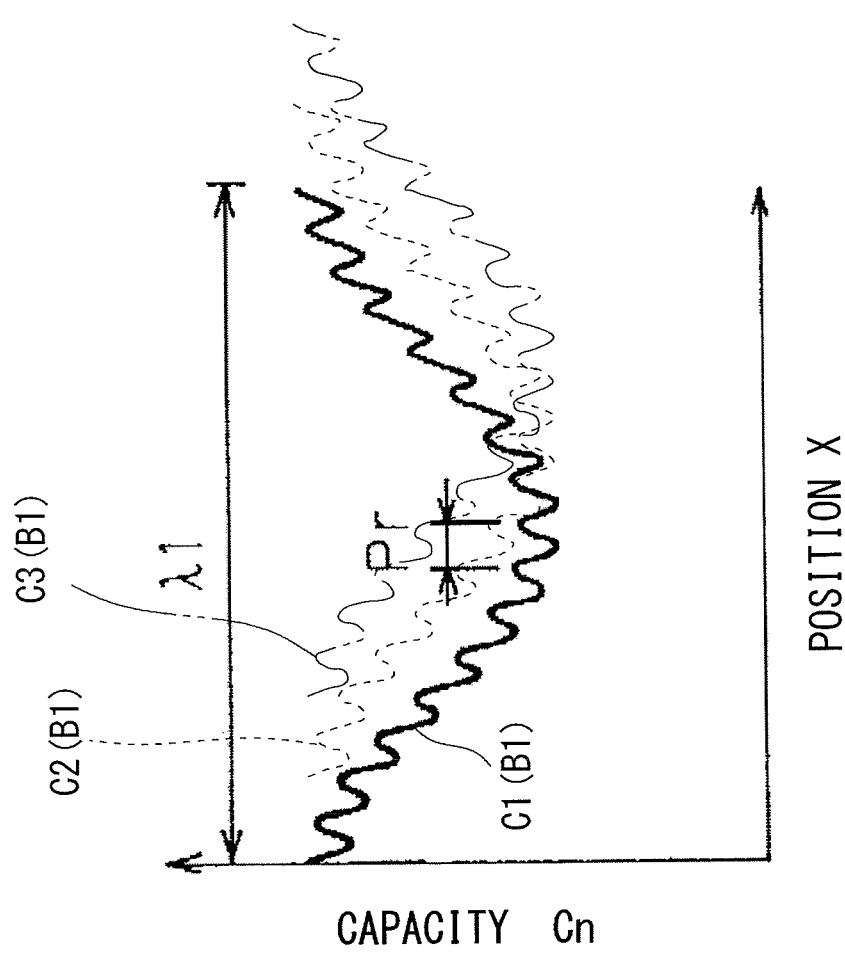
FIG. 4 is a graph illustrating changes in a capacity value between a transmission electrode and a detection electrode.

The capacity Cn(B1) is represented as follows and illustrated in a graph of FIG. 4:

$Cn(B1)=B \sin 2\pi\{(x/\lambda 1)-(n/8)\}+C \sin 2\pi\{(x/Pr)-(3n/8)\}+D$ where B is amplitude of the long period, C is amplitude of the short period (pr), and D is an offset value.

Similarly, it will be described how the capacity between any one of the transmission electrodes 23 and the other of the first detection electrodes (26b) is changed according to the position x.

One of the first detection electrodes (26a) is shifted from the other (26b) by a half period, and the long period ($\lambda 1$) is a reversed phase.

The capacity is represented by Cn(B2).

Figure 5:
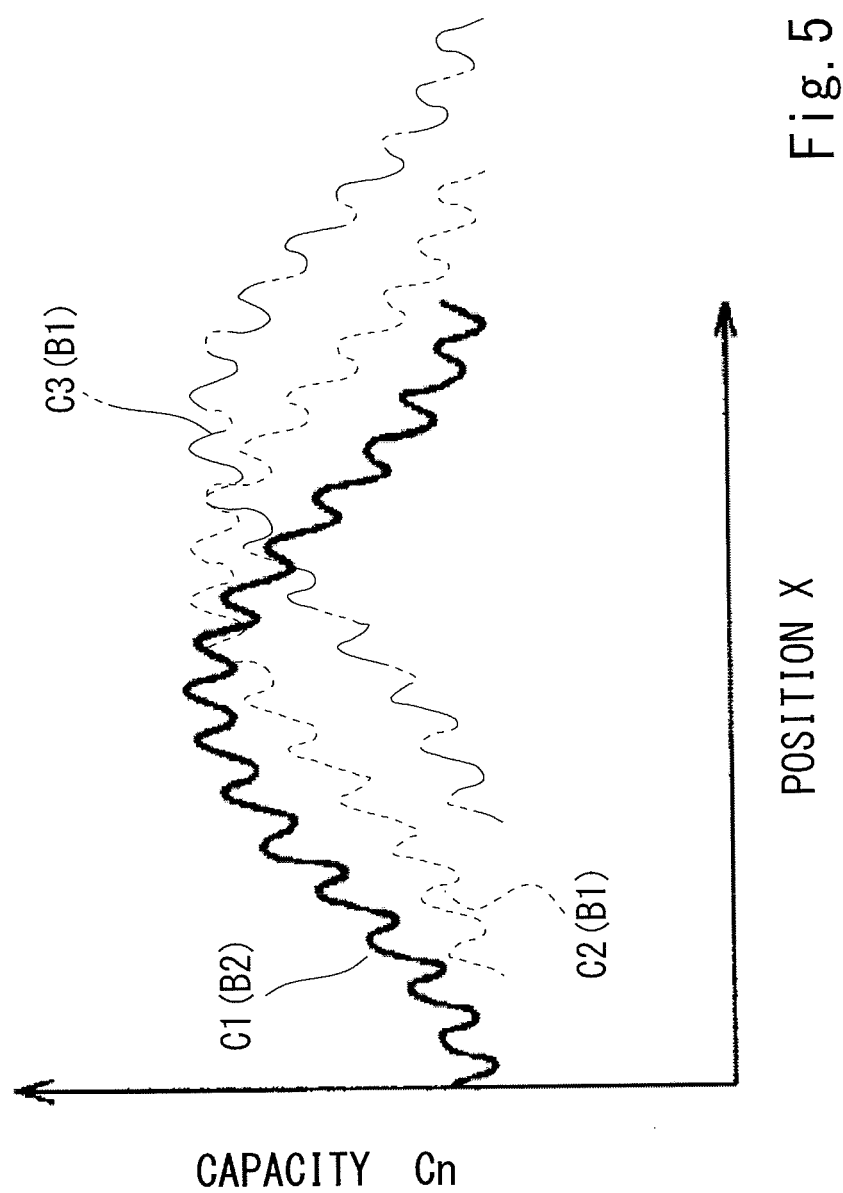
FIG. 5 is a graph illustrating changes in the capacity value between the transmission electrode and the detection electrode.

The capacity Cn(B2) is represented as the following expressions and illustrated in a graph of FIG. 5:

$Cn(B2)=-B \sin 2\pi\{(x/\lambda 1)-(n/8)\}+C \sin 2\pi\{(x/Pr)-(3n/8)\}+D$

The capacity is the function of the position x, and which phase of the transmission electrodes 23 to be strongly coupled with the detection electrode 26a, 26b is changed according to x.

The first detection electrodes 26a and 26b are capacitance-coupled with the transmission electrode 23, and voltage is induced in the first detection electrodes 26a and 26b.

The change of the induced voltage is extracted as detection signals B1 and B2 and represented as follows:

$$B1 = \sum_{n=0}^{7} C_n(B1) \cdot V_n \quad \text{[Expression 1]}$$

$$B2 = \sum_{n=0}^{7} C_n(B2) \cdot V_n$$

Detection signals C1 and C2 detected by the second detection electrodes 27a and 27b are represented similarly.

Here, it is assumed that the long period ($\lambda 1$) of the detection signals B1 and B2 is several tens of times the short period (Pr).

Furthermore, it is assumed that long period ($\lambda 2$) of the detection signals C1 and C2 is several tens of times the long period ($\lambda 1$) of the detection signals B1 and B2.

Then, the phase displacement can be acquired at all levels of the coarse period (coarse scale), the medium period (medium scale), and the fine period (fine scale), by calculating the following expressions:

(coarse scale):$C1-C2$ (medium scale):$B1-B2$ (fine scale):$(B1+B2)-(C1+C2)$

Figure 6:
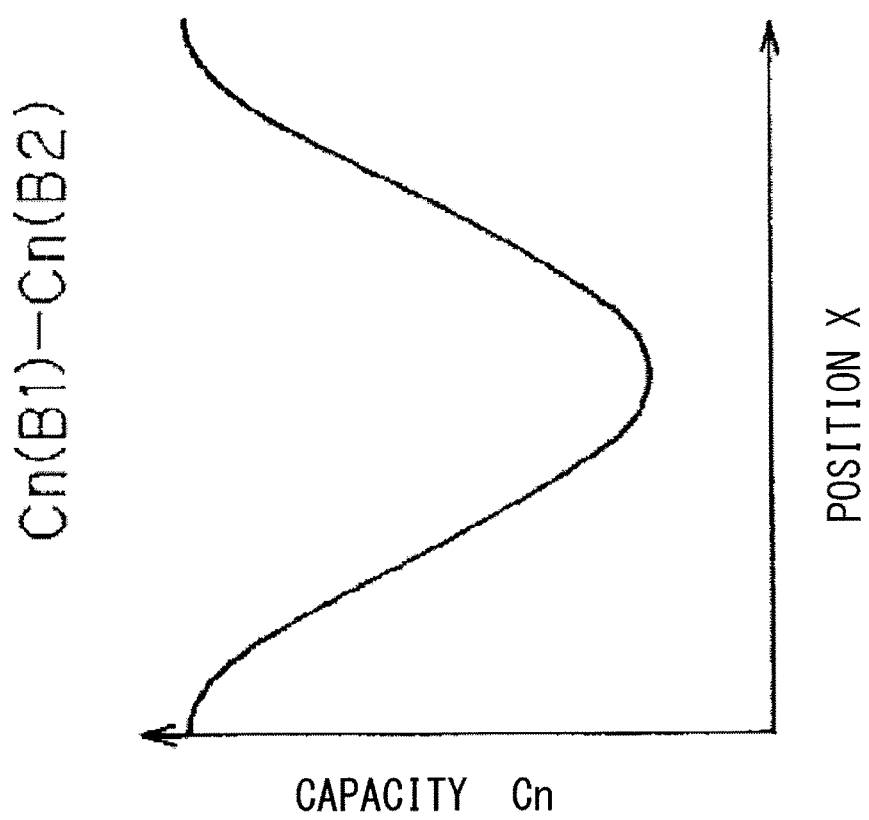
FIG. 6 is a graph illustrating results obtained by subtracting a detection signal B2 from a detection signal B1.
Figure 7:
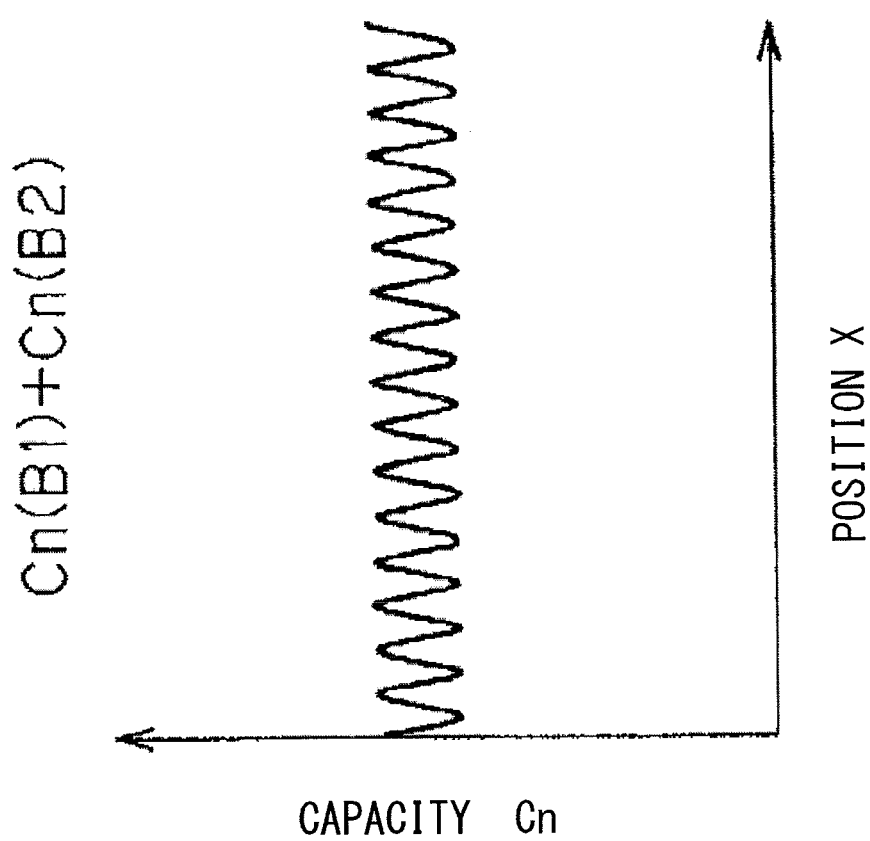
FIG. 7 is a graph illustrating results obtained by adding detection signals B1 and B2.

In this connection, the results of [B1−B2] are illustrated in FIG. 6, and the results of [B1+B2] are illustrated in FIG. 7.

Based on Expression 1, the coarse scale signal, the medium scale signal, and the fine scale signal are also represented, for example, as follows:

$$\text{(coarse scale): } C1 - C2 = K_1 \cos 2\pi\left(\frac{x}{\lambda_2} - \frac{t}{T}\right) \quad \text{[Expression 2]}$$

$$\text{(medium scale): } B1 - B2 = K_2 \cos 2\pi\left(\frac{x}{\lambda_1} - \frac{t}{T}\right)$$

$$\text{(fine scale): } (B1 + B2) - (C1 + C2) = K_3 \cos 2\pi\left(\frac{x}{Pr} - \frac{t}{T}\right)$$

Here, it is assumed that, for example, the time of the zero-crossing point of the fine scale signal is t0, and the following expressions are established:

$$2\pi\left(\frac{x}{Pr} - \frac{t_0}{T}\right) = \frac{\pi}{2}$$ [Expression 3]

$$x = \left(\frac{1}{4} + \frac{t_0}{T}\right)Pr$$ [Expression 4]

By counting the time from a reference time, when the phase of the reference signal is 0, to the zero-crossing point t0 with a counter or the like, the position x of the detection head 21 is calculated.

The signal processor 200 will be described.

FIG. 8 is a functional block diagram illustrating the signal processor 200.

The signal processor 200 includes a control circuit 210, a transmission waveform generation circuit 220, a demodulator 230, a phase detector 300, a combining circuit 270, and an actual size converter 280.

The control circuit 210 controls the operation timing of the entire system by supplying a drive control signal, a clock signal, and a reset signal to the circuits.

The control circuit 210 includes a timer 211. With the timer 211, the display refresh cycle of the display 17 is controlled so as to be a certain intermittent period (for example, at an interval of 100 msec). Then, ON and OFF of the circuit operations are controlled so that the phase data is extracted, combined, and displayed in each display refresh cycle. The control circuit 210 supplies the enable signal ENB, which rises at an interval of 100 msec and continues for a predetermined time, to the transmission waveform generation circuit 220, the demodulator 230, the phase detector 300, the combining circuit 270, and the actual size converter 280.

The transmission waveform generation circuit 220 generates the period signals a to h of eight phases, which are shifted from each other by 45°, and supplies the signals to the transmission electrodes 23 as the drive signal Sd.

The demodulator 230 includes a coarse scale demodulator 231, a medium scale demodulator 232, and a fine scale demodulator 233.

The detection signals C1 and C2 from the second detection electrodes 27a and 27b are input to the coarse scale demodulator 231.

Thus, the coarse scale demodulator 231 demodulates the coarse scale signal obtained by "C1–C2".

The detection signals B1 and B2 from the first detection electrodes 26a and 26b are input to the medium scale demodulator 232.

Thus, the medium scale demodulator 232 demodulates the medium scale signal obtained by "B1–B2".

The detection signals B1, B2, C1, and C2 from the first detection electrodes 26a and 26b, and the second detection electrodes 27a and 27b are input to the fine scale demodulator 233.

Thus, the fine scale demodulator 233 demodulates the fine scale signal obtained by "(B1+B2)–(C1+C2)".

Specifically, in the demodulation, sampling, mixing, low-frequency filtering, or binarizing is performed to the transmission waveform in a chop frequency. Thus, the rectangular period signal CMP having the phase information at the edge is generated. In other words, a coarse scale signal (CMP-COA), a medium scale signal (CMP-MED), and a fine scale signal (CMP-FIN) are obtained.

The phase detector 300 includes a coarse phase detector 310, a medium phase detector 320, and a fine phase detector 330.

The coarse scale signal (CMP-COA) is input to the coarse phase detector 310.

The medium scale signal (CMP-MED) is input to the medium phase detector 320.

The fine scale signal (CMP-FIN) is input to the fine phase detector 330.

The phase detector 300 will be detailedly described.

The coarse phase detector 310, the medium phase detector 320, and the fine phase detector 330 have basically the same configuration, and the fine phase detector 330 will be exemplified here.

Figure 9:
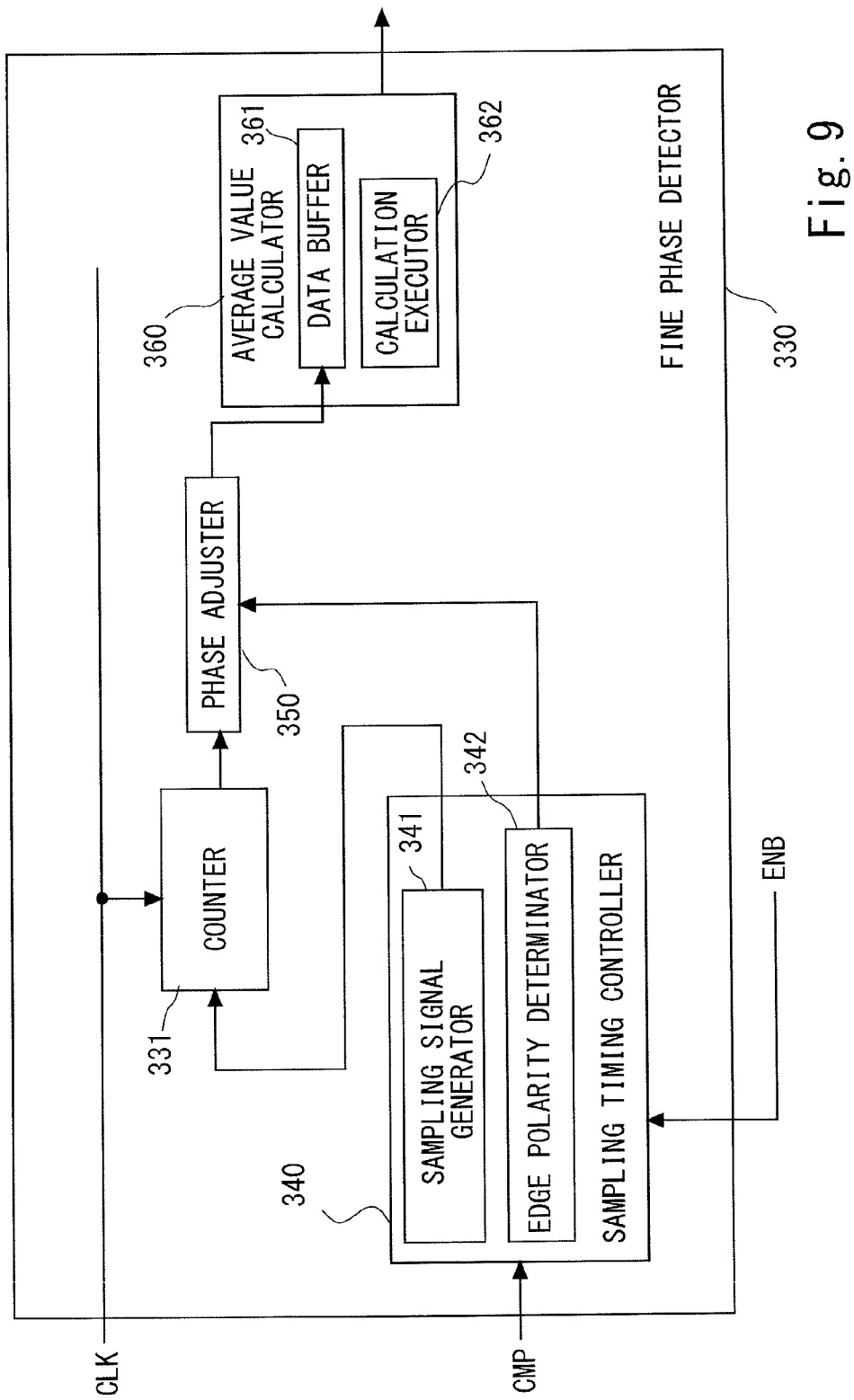
FIG. 9 is a functional block diagram of a fine phase detector.

FIG. 9 is a functional block diagram illustrating the fine phase detector 330.

The fine phase detector 330 includes a counter 331, a sampling timing controller 340, a phase adjuster 350, and an average value calculator 360.

The counter 331 is a loop counter and counts up according to the clock pulse.

In the present exemplary embodiment, a cycle of the counter 331 is to be four periods of the period signal. (A period of the period signal equals to a period of the scale signal CMP. That is, a cycle of the counter 331 also equals to four periods of the scale signal CMP accordingly.)

This is based on the assumption that the average value of four count values is to be the phase information in the fine phase detector 330. A cycle of the counter 331 does not necessarily equal to exact four periods of the period signal, and is only required to be four periods or more of the period signal.

For example, when an average value of two count values is to be the phase information in the coarse phase detector 310 or the medium phase detector 320, a cycle of the counter is to be two periods of the reference signal.

Thus, when the number of the count values used to calculate the average value is k, a cycle of the counter is to be k/2 periods of the reference signal.

Figure 10:
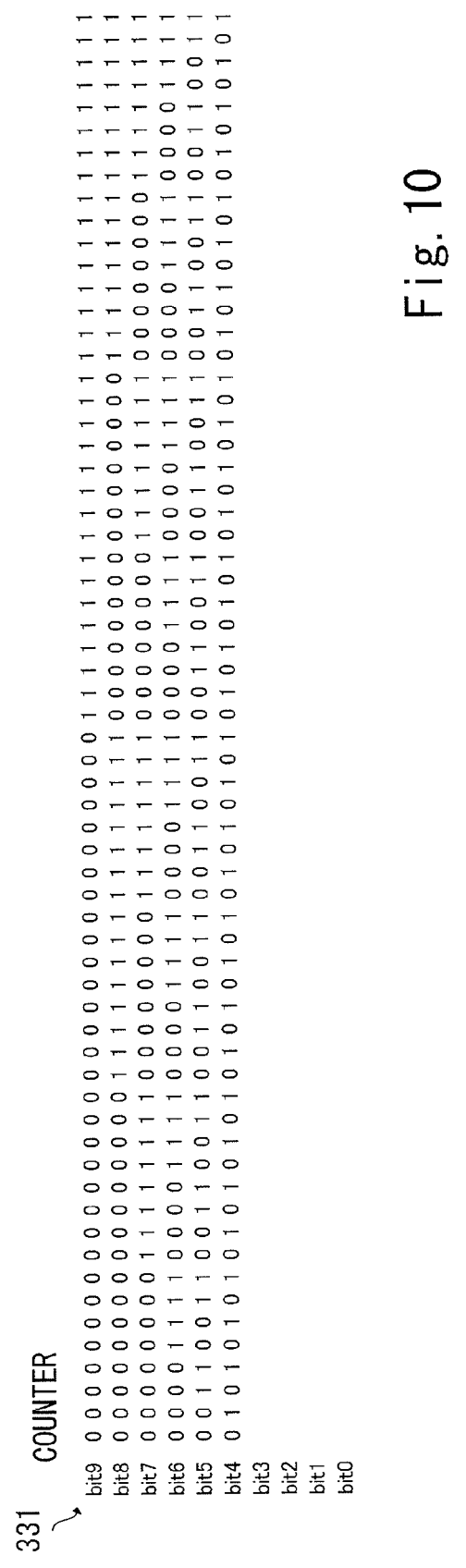

H, it is assumed that the counter 331 is a 10 bits counter. (As described above, 10 bits or more may be used.) In other words, the counter 331 counts so as to divide four periods of the reference signal Sd0 into 1023. This is equivalent to that a period of the period signal is divided by 8 bits (256). Thus, the count values of the low-order 8 bits are equivalent to that phase values in a period are indicated as digital values based on a cycle of the reference signal Sd0. FIG. 10 illustrates the state where the counter 331 counts up. Note that, low-order bits of bit0 to bit3 are omitted for convenience of paper width.

For example, when the control circuit 210 generates a start signal at a predetermined interval (for example, at an interval of 100 msec), the transmission waveform generation circuit 220, the demodulator 230, and the phase detector 300 start to operate in response to the start signal. In other words, in response to the start signal, the transmission waveform generation circuit 220 generates the drive signal Sd, and the counter 331 starts to count up from zero. Thus, the counter 331 synchronizes with the reference signal Sd0 at a phase number 0 (period signal a). The count value is output to the phase adjuster 350.

The fine scale signal (CMP-FIN) from the fine scale demodulator 233 and the enable signal ENB from the control circuit 210 at an interval of 100 msec are input to the sampling timing controller 340.

The sampling timing controller 340 instructs, based on the fine scale signal (CMP-FIN) and the enable signal ENB, the counter 331 to output the count value, and instructs, if necessary, the phase adjuster 350 to adjust the phase.

The sampling timing controller 340 includes a sampling signal generator 341 and an edge polarity determinator 342.

The enable signal ENB from the control circuit 210 and the fine scale signal (CMP-FIN) from the fine scale demodulator 233 are input to the sampling signal generator 341.

The sampling signal generator 341 generates sampling signal which rises four times at the timing of the edges of the fine scale signal (CMP-FIN) after the enable signal ENB rises.

Since the average value obtained by averaging four sampling values is the phase information in order to detect the phase of the fine scale signal, the sampling signal is set so as to rise four times.

For example, to detect the phase of the medium scale signal (CMP-MED) or the coarse scale signal (CMP-COA), when the average value is calculated from two sampling values, the sampling signal rises two times.

Whether the edge of the fine scale signal (CMP-FIN) is a rising edge or a falling edge is not distinguished.

Figure 11:
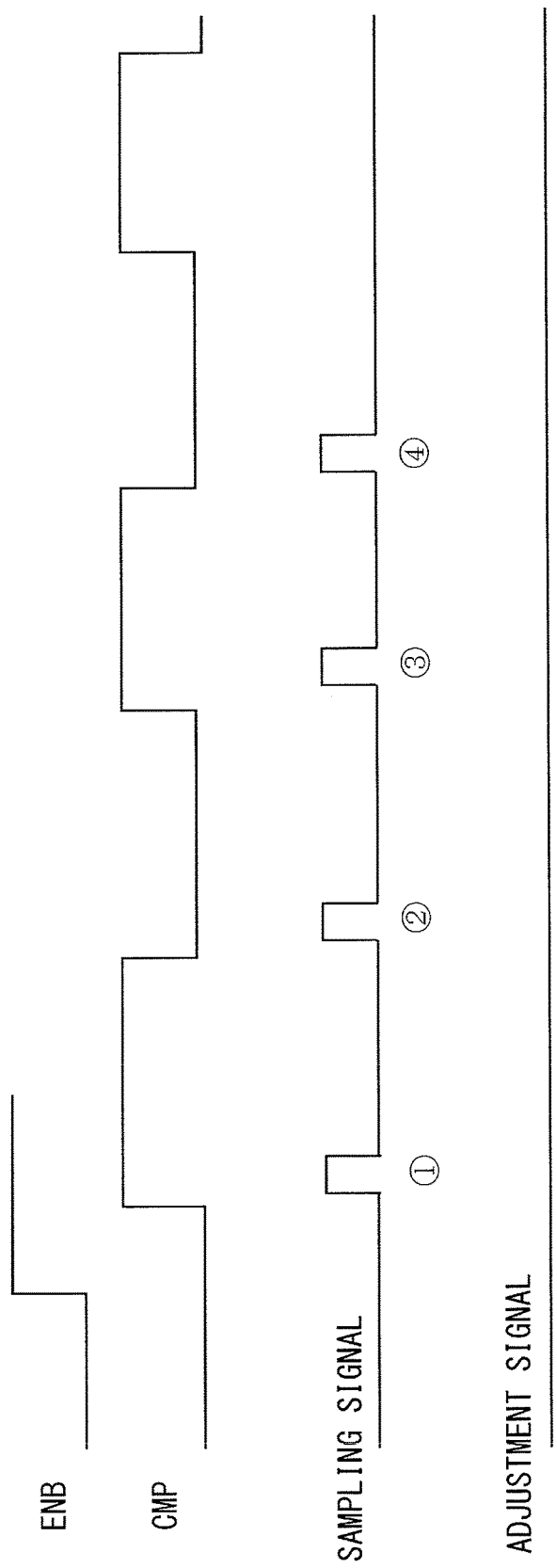
FIG. 11 is a diagram illustrating a state where a count value is sampled at a timing of an edge of a scale signal CMP.

For example, as illustrated in FIG. 11, after the enable signal ENB rises and when the first edge of the fine scale signal (CMP-FIN) is a rising edge, the sampling signal rises four times from the rising edge.

This is similar to the background art.

Figure 12:
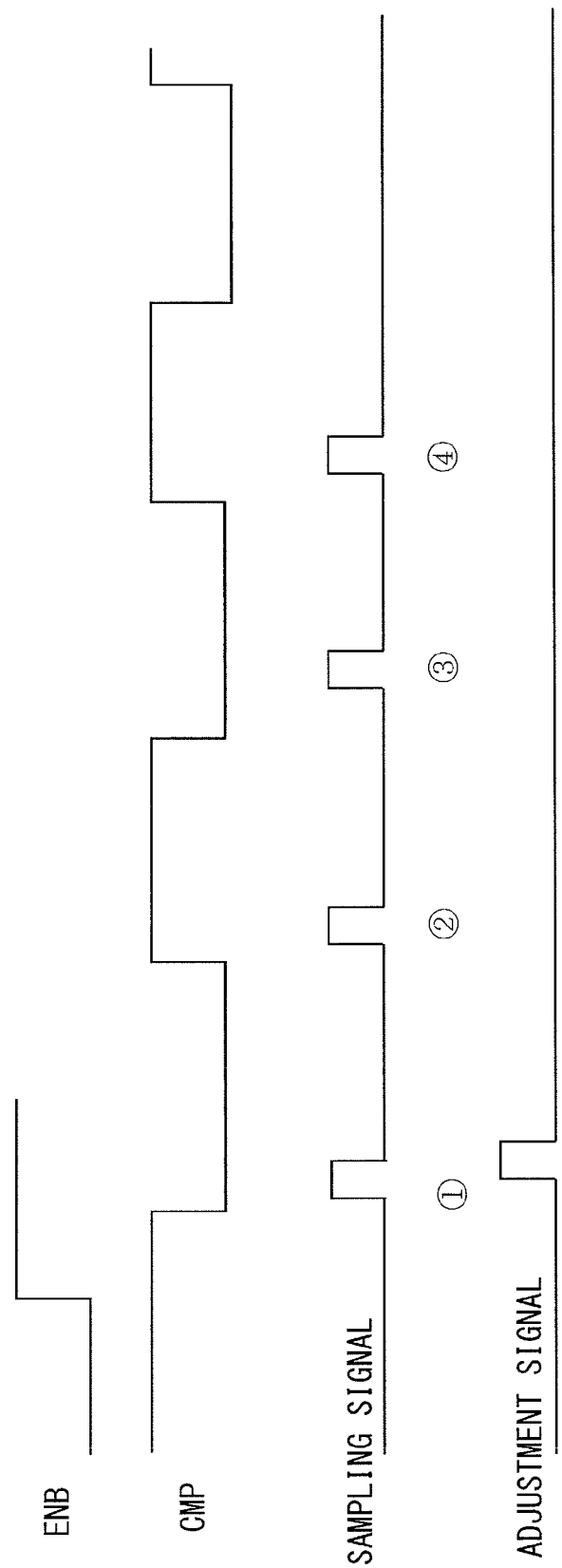
FIG. 12 is a diagram illustrating a state where a count value is sampled at a timing of an edge of a scale signal CMP.

On the other hand, as illustrated in FIG. 12, after the enable signal ENB rises and when the first edge of the fine scale signal (CMP-FIN) is a falling edge, the sampling signal rises four times form the falling edge in this case. The sampling signal generated in this manner is supplied to the counter 331.

The counter 331 outputs the count value at the timing of the sampling signal.

The enable signal ENB from the control circuit 210 and the fine scale signal (CMP-FIN) from the fine scale demodulator 233 are input to the edge polarity determinator 342.

The edge polarity determinator 342 determines the edge polarity of the fine scale signal (CMP-FIN) which appears immediately after the enable signal ENB rises. Then, when the edge polarity of the fine scale signal (CMP-FIN) which appears immediately after the enable signal ENB rises is a falling edge, the edge polarity determinator 342 outputs the adjustment signal to the phase adjuster 350. For example, the edge polarity of the fine scale signal (CMP-FIN) which appears immediately after the enable signal ENB rises is a rising edge in the case of FIG. 11. In this case, the adjustment signal keeps LOW level.

In contrast, the edge polarity of the fine scale signal (CMP-FIN) which appears immediately after the enable signal ENB rises is a falling edge in the case of FIG. 12.

In this case, the edge polarity determinator 342 supplies the adjustment signal at HIGH level to the phase adjuster 350.

The phase adjuster 350 adjusts the count value from the counter 331 according to the adjustment signal from the edge polarity determinator 342.

When the edge polarity of the fine scale signal (CMP-FIN) which appears immediately after the enable signal ENB rises is a falling edge, the edge polarity determinator 342 outputs the adjustment signal to the phase adjuster 350 (FIG. 12).

When receiving the adjustment signal, the phase adjuster 350 adds an adjustment amount to the count value from the counter 331.

Here, the adjustment amount is a half period of the fine scale signal (CMP-FIN).

Since the counter 331 is set so that a cycle of the counter (1024) is equivalent to four periods, the half period of the fine scale signal (CMP-FIN) as the adjustment amount is equivalent to 128 in a counter value.

The value is represented by "0010000000" in binary.

In other words, the adjustment amount is, based on a cycle of the counter, to be ⅛ of a cycle of the counter.

When a cycle of the counter is 360° (2π), the adjustment amount is to be 45° (π/4).

The count value is adjusted according to the edge polarity at the time when the sampling is started.

The count value adjusted in this manner is output to the average value calculator 360.

When the adjustment signal is not received from the edge polarity determinator 342, the phase adjuster 350 directly outputs the count value from the counter 331 to the average value calculator 360.

The average value calculator 360 calculates the average value of the count values supplied from the phase adjuster 350.

The average value calculator 360 includes a data buffer 361 and a calculation executor 362.

The data buffer 361 buffers the count value supplied from the phase adjuster 350 four times and send the four count values to the calculation executor 362.

The calculation executor 362 calculates an average value of the four count values supplied from the buffer 361. That is, the four count values are added and divided by four.

Figure 13:
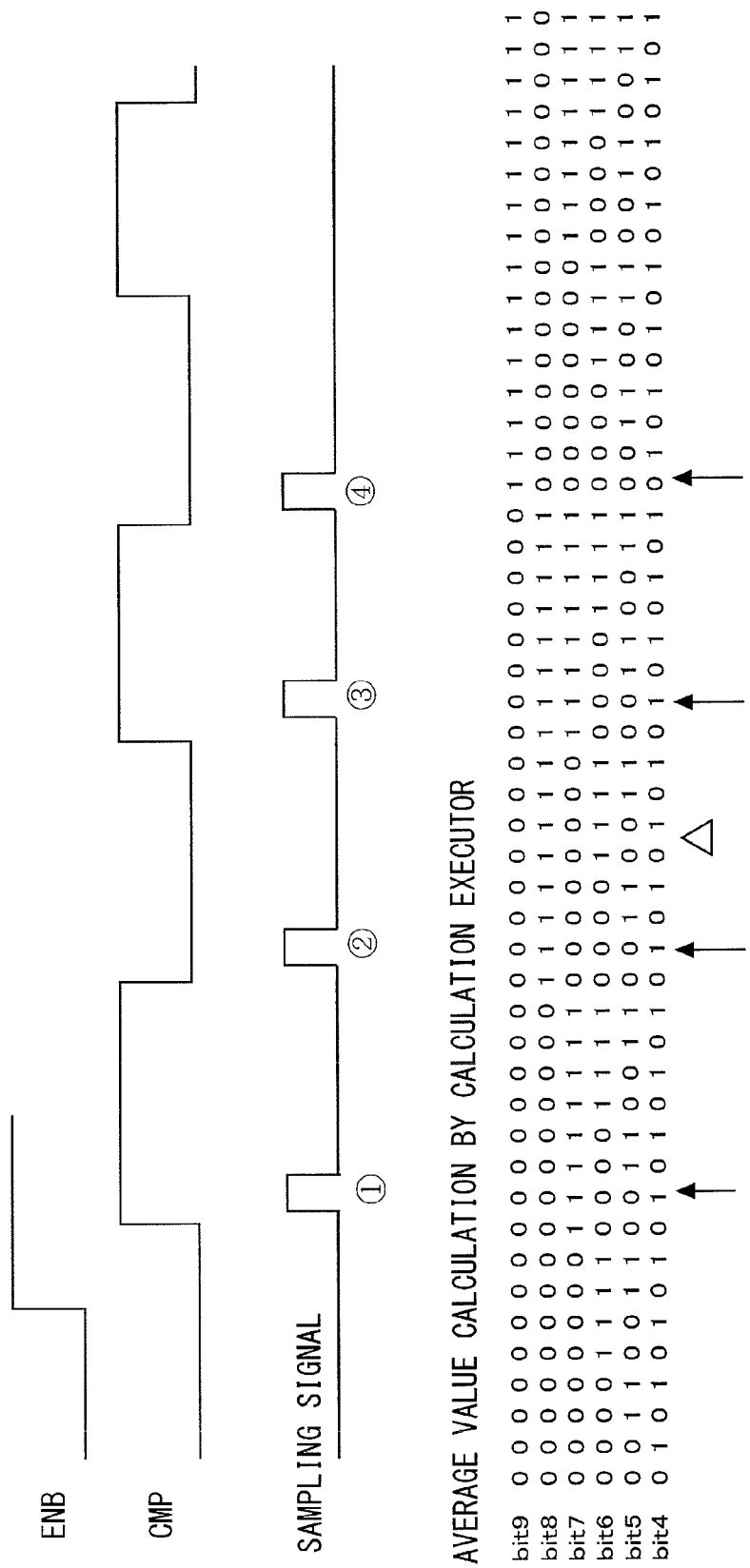
FIG. 13 is a diagram illustrating a state where an average value is calculated from four count values.

FIG. 13 illustrates the state where the average value is calculated from the four count values.

When four count values are fetched according to the timing of the sampling signal and averaged, the value indicated by a triangle in the diagram is equivalent to the average value.

In the case of FIG. 13, the sampling is started from the rising edge, and the value is directly used in post processing (for example, combining processing or actual size conversion).

The following cases cause problems, which will be described with reference to FIGS. 14 and 15.

Figure 14:
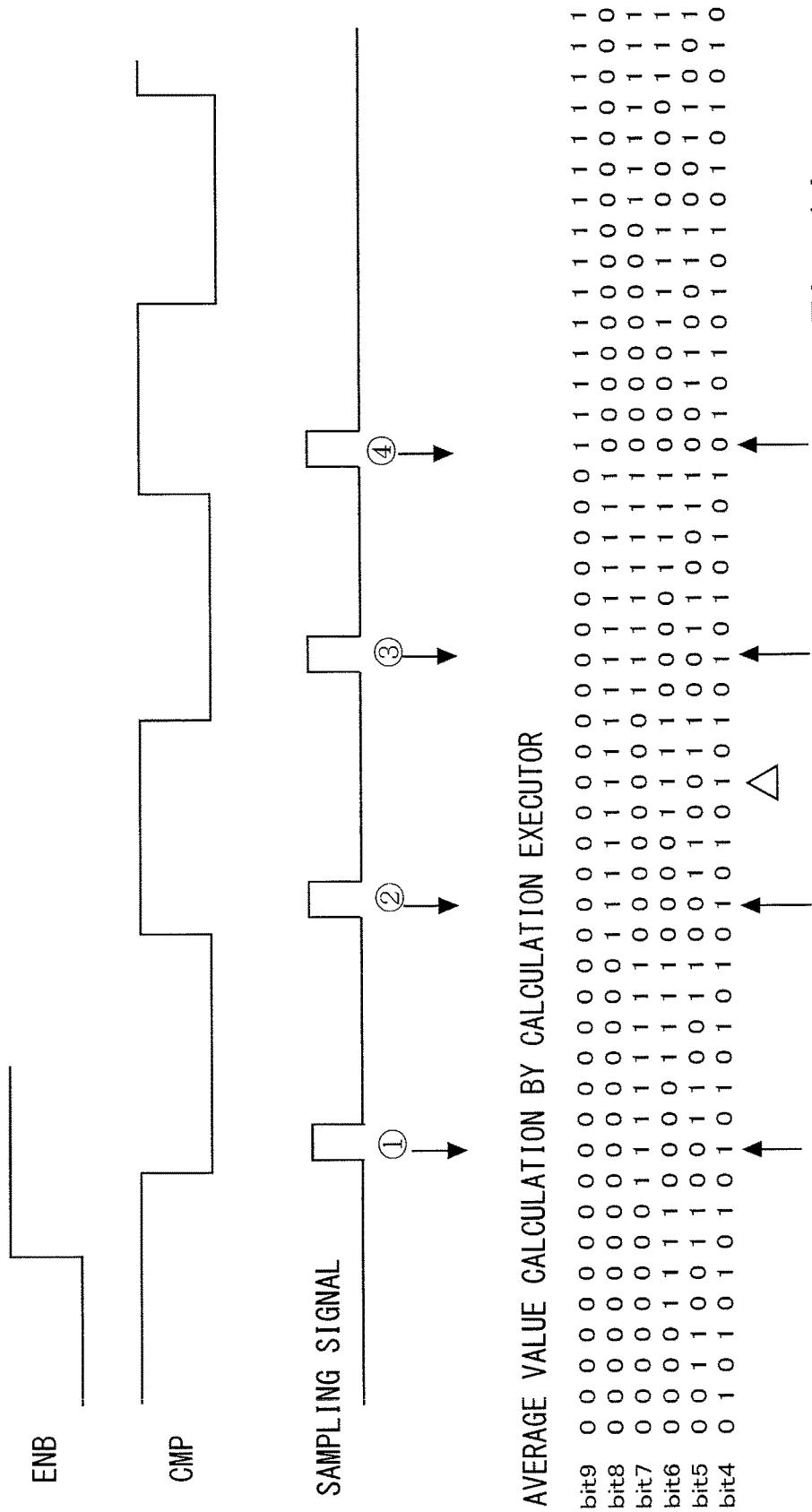
FIG. 14 is a diagram illustrating a state where an average value is calculated from four count values.

In FIG. 14, the problem in which the phase is not adjusted by the phase adjuster 350 is illustrated.

In FIG. 14, the first edge of the fine scale signal (CMP-FIN) which appears immediately after the enable signal ENB rises is a falling edge.

As described above, the sampling signal rises four times from the falling edge which is the first edge of the fine scale signal (CMP-FIN) in this case. The count values of the counter 331 are fetched according to the sampling signal.

Then, the calculation executor 362 calculates the average value of the four count values.

The average value is indicated by a triangle in FIG. 14.

However, the fetching of the count value is started from the falling edge of the fine scale signal (CMP-FIN) in the case of FIG. 14.

The average value calculated in this manner has a shift in comparison with that in the case where the sampling is started from the rising edge.

Thus, when the value is directly used in the post processing (combining processing or actual size conversion), a shift is generated in the measurement value.

Figure 15:
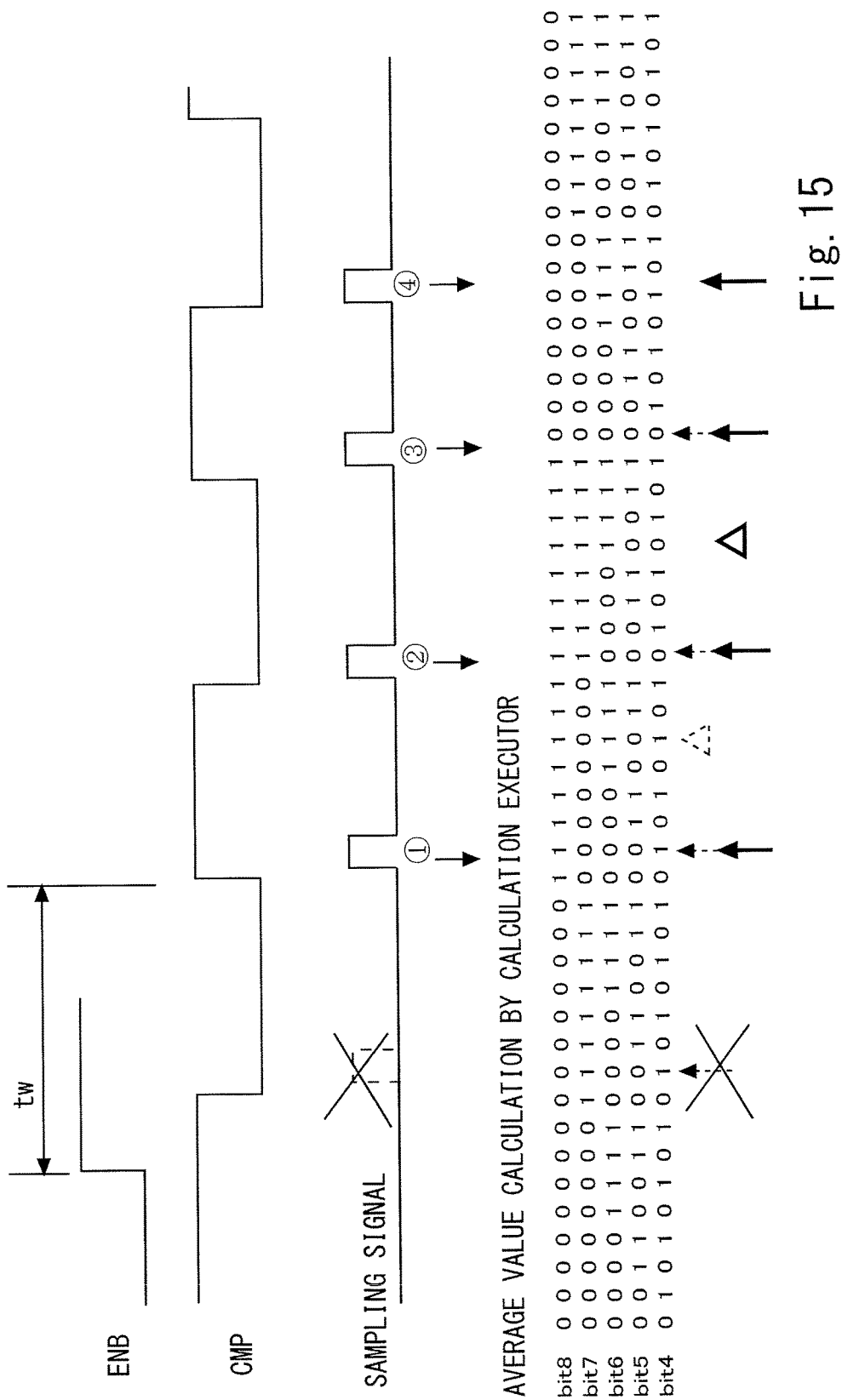
FIG. 15 is a diagram illustrating a state where an average value is calculated from four count values.

This problem is compared to the case of FIG. 15. In FIG. 15, the fetching of the count values is withheld after the enable signal ENB becomes ON and until the rising edge of the fine scale signal (CMP-FIN) appears. The average value of four count values is indicated by a triangle with a solid line in the diagram. (The value of the case of FIG. 14 is indicated by a triangle with a dashed line for comparison.)

By comparing the average value of FIG. 14 with that of FIG. 15, the fine scale signal (CMP-FIN) is shifted by a half period.

Figure 16:
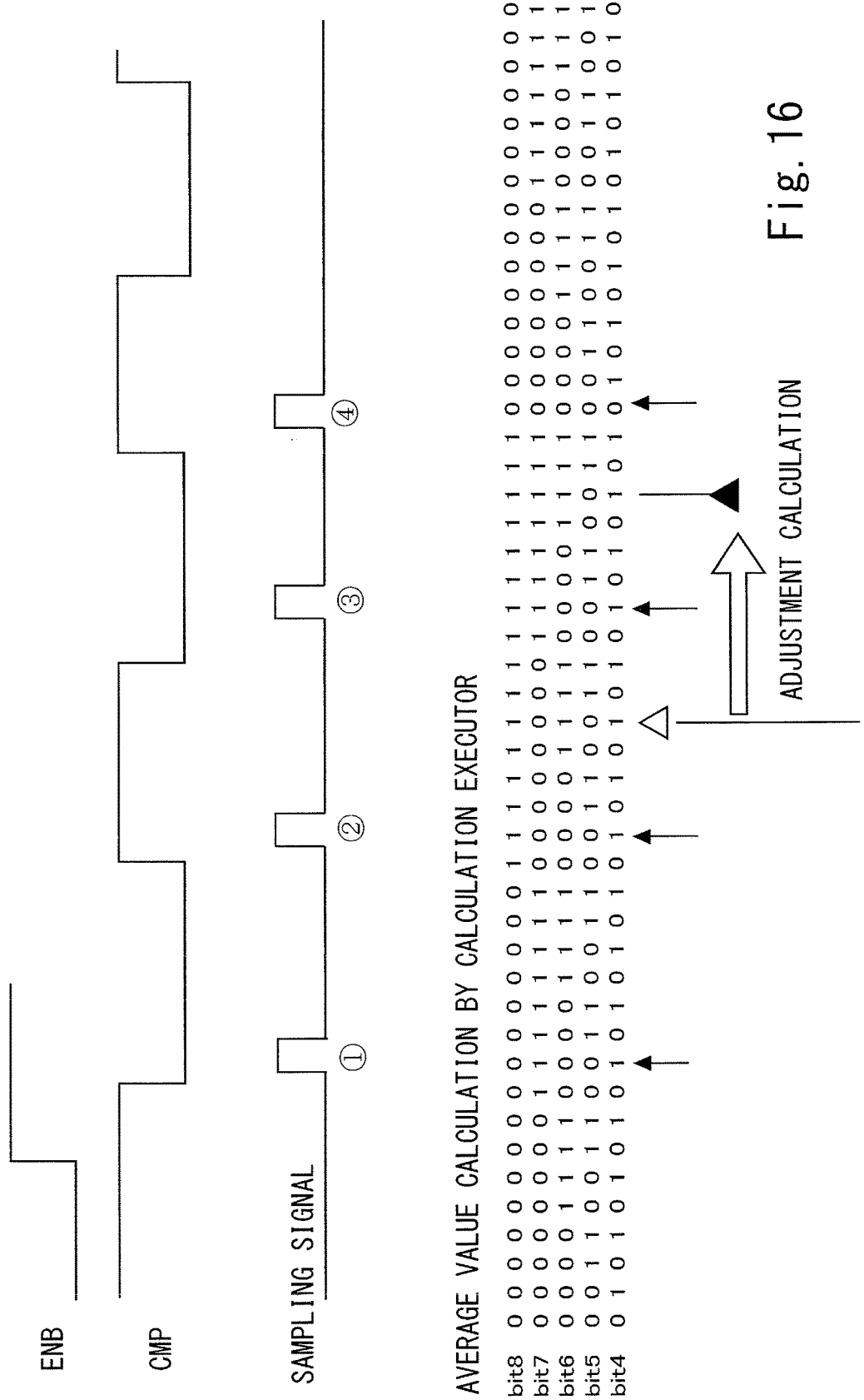
FIG. 16 is a diagram illustrating adjustment processing.

Thus, as illustrated in FIG. 16, a value equivalent to a half period of the fine scale signal (CMP-FIN) is to be added. The phase adjuster 350 performs the processing.

Although the number of samples to be averaged is four in the above example, the adjustment amount may be similarly added when the number of samples to be averaged is the number other than four, for example, 2, 3, 5, 6 . . . .

Figure 17:
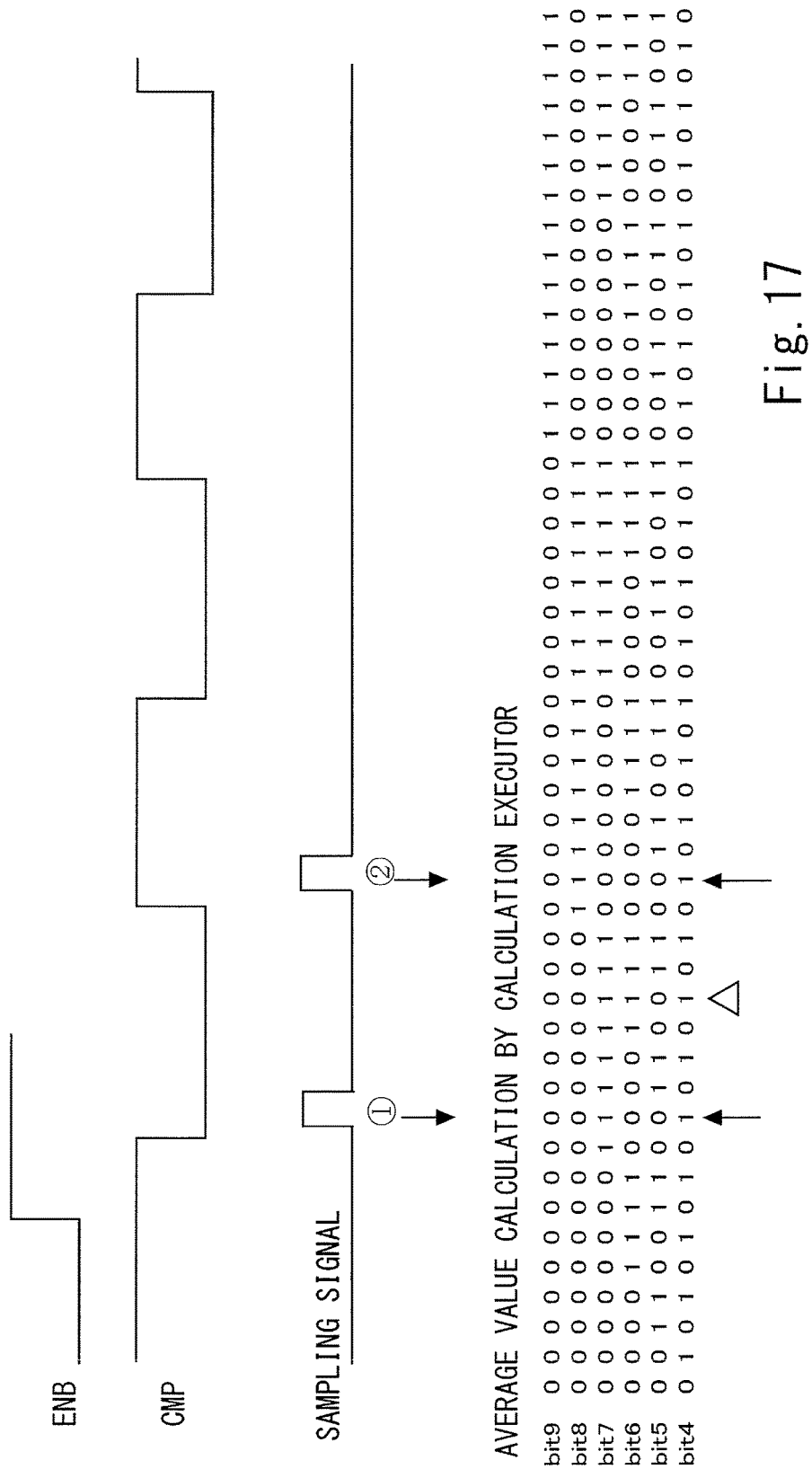
FIG. 17 is a diagram illustrating a state where an average value is calculated from two count values.
Figure 18:
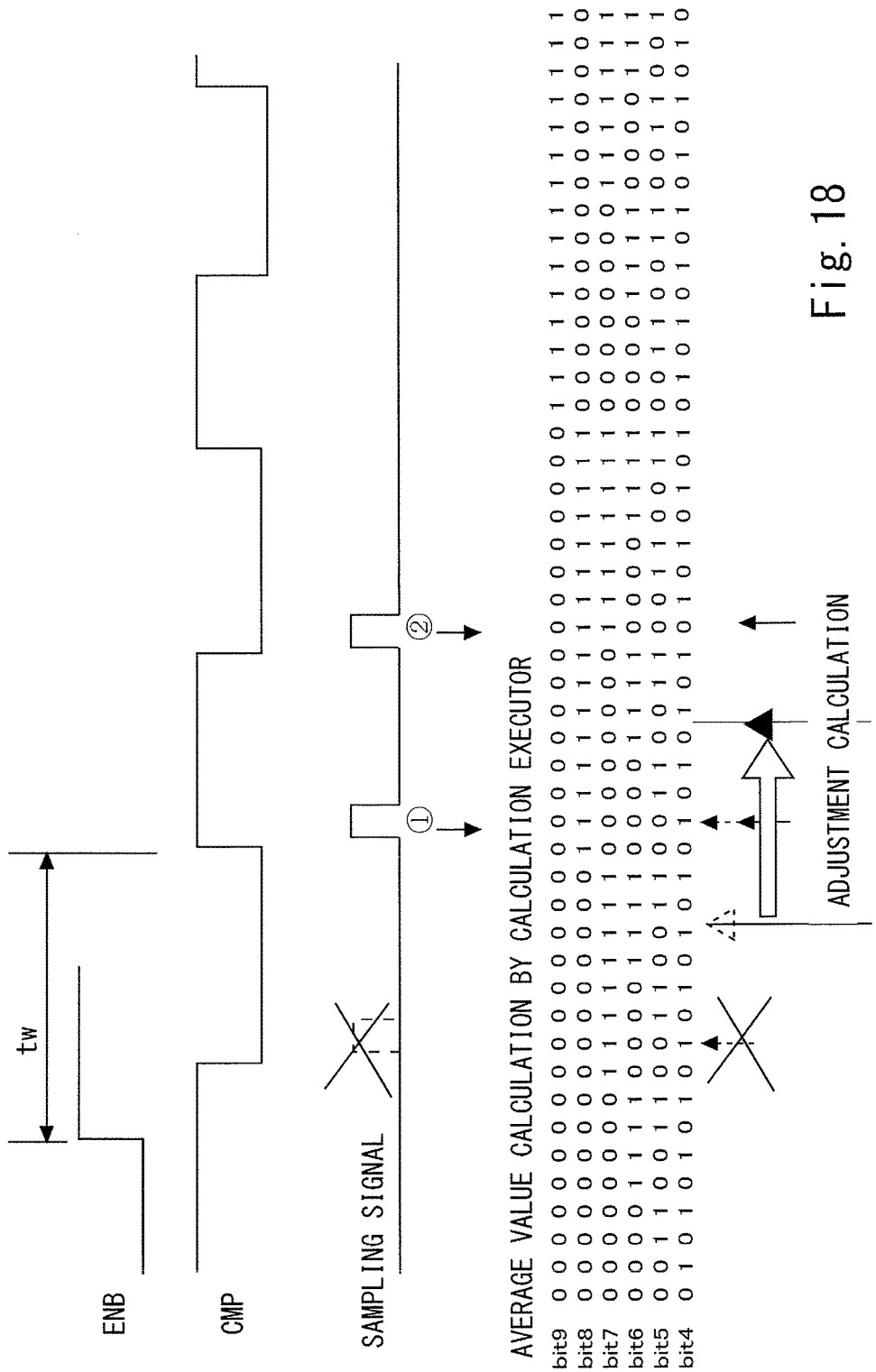
FIG. 18 is a diagram illustrating a state where an average value is calculated from two count values.
Figure 19:
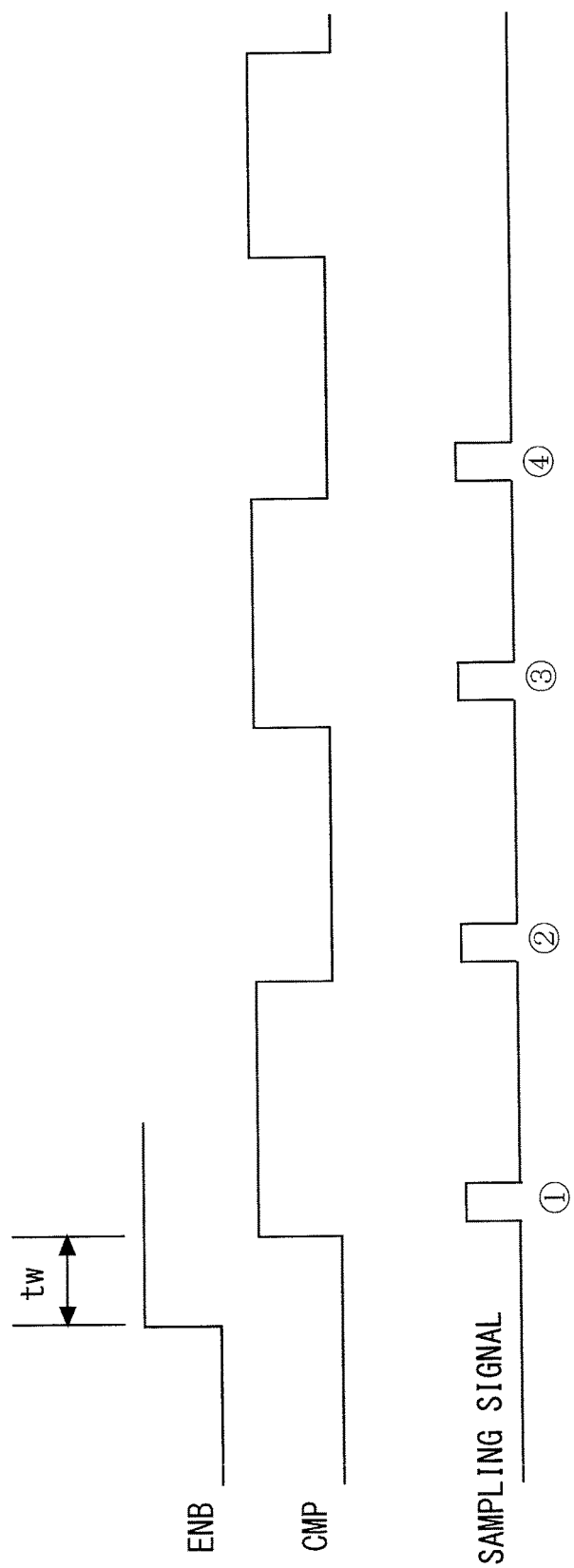
FIG. 19 is a timing chart illustrating relation between a sample enable signal ENB and a periodic square wave signal CMP.
Figure 20:
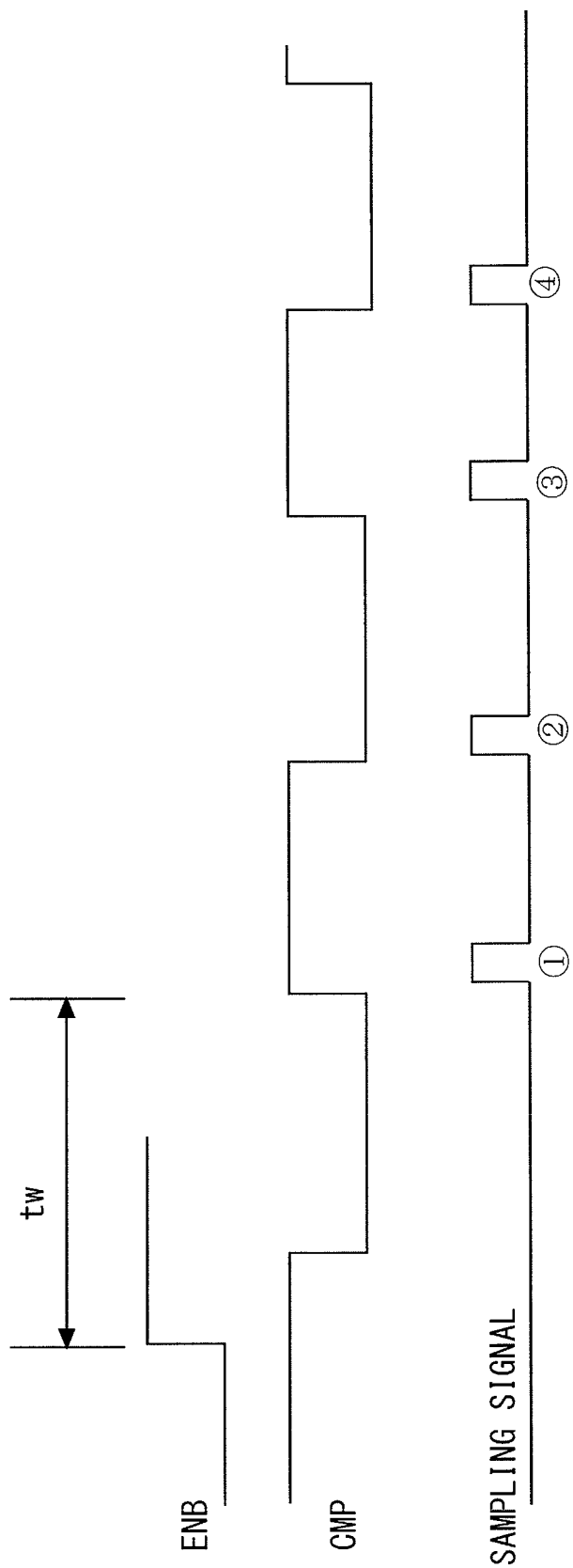
FIG. 20 is a timing chart illustrating relation between a sample enable signal ENB and a periodic square wave signal CMP.

For example, by comparing FIG. 17 with FIG. 18, it is apparent that the adjustment amount is the same when the number of samples to be averaged is two.

In this case, the adjustment amount is, based on a cycle of the counter, to be ¼ of a cycle of counter.

When a period of the counter is 360° ($2\pi$), the adjustment amount is to be 90° ($\pi/2$).

When the number of count values to calculate an average value is k, a cycle of the counter is k/2 periods of the reference signal.

Thus, the adjustment amount is [a cycle of the counter/k].

The coarse phase detector 310 and the medium phase detector 320 detect the phase similarly to the fine phase detector 330.

The detected digital phase information is weighted and combined by the combining circuit 270.

The output from the combining circuit 270 is converted into an actual size value by the actual size converter 280. The actual size value acquired by the actual size converter 280 is displayed on the display 17.

The present exemplary embodiment having the above configuration has the following effects:

(1) Conventionally, the start of the sampling of the phase information has been withheld until a rising edge of the scale signal CMP appears. Thus, time and power have been wastefully consumed.

In contrast, the sampling of the phase information is started not only from a rising edge, but also from a falling edge in the present exemplary embodiment. Thus, the waiting time tw is within a half period of the scale signal CMP if it is estimated at most. For example, when the phase information is obtained by averaging four count values, it is possible to improve the power efficiency by about 10%.

Incidentally, a capacitive absolute encoder consumes lower power than other types of encoder, for example, a photoelectric or a magnetic encoder. Furthermore, although the capacitive encoder includes a phase discrimination type encoder and a voltage comparison type encoder, the phase discrimination type encoder consumes lower power than the other. From these facts, the displacement measuring device of the present exemplary embodiment consume extremely low power.

(2) When the sampling of the count value is started from a falling edge. inconsistencies are caused in the post processing (composing processing or actual size conversion) and an incorrect measurement value is displayed. However, in the present exemplary embodiment, the adjustment calculation is performed according to the edge polarity at the time when the sampling is started. Thus, when the sampling of the count value is started from a falling edge, the adjusted value is the same as the value when the sampling of the count value is started from a rising edge.

A precise displacement measuring device which does not wastefully consume the time and power can be implemented accordingly.

The present invention is not limited to the above exemplary embodiment and may be modified without departing from the scope of the invention.

The applicable range of the present invention is not limited to a capacitive encoder or a linear movement type encoder.

As long as it is an encoder which can calculate an absolute position based on the phase information, the present invention may be applied to a photoelectric or magnetic encoder as well as a rotary encoder.

In the above embodiment, it is assumed that the sampling is started from a rising edge as a standard and the post processing (composing processing or actual size conversion) is performed.

Thus, when the sampling is started from a falling edge, the adjustment amount is added for consistency with the standard, and vice versa. That is. it is assumed that the sampling is started from a falling edge as a standard and the post processing (composing processing or actual size conversion) is performed. In this case, when the sampling is started form a rising edge, the adjustment amount is necessary to be added.

Although the loop counter counts up, and the same theory can be applied to the loop counter which counts down. It is apparent that the technical scope of the present invention includes this type of modification.

It has been described that the adjustment amount is added to the count value before the average value is calculated. The adjustment amount may be added after the average value is calculated.

The invention claimed is:

1. A displacement measuring device comprising:
a main scale;
a detection head provided to be relatively displaceable to the main scale and configured to output a periodic signal having a phase to be changed according to relative displacement to the main scale;
a demodulator configured to demodulate the periodic signal into a rectangular wave scale signal having phase information at an edge;
a phase detector configured to detect the phase information of the rectangular wave scale signal at a timing of the edge, wherein
the phase detector comprises:
a sampling signal generator configured to generate a sampling signal at the timing of the edge of the rectangular wave scale signal;
a counter configured to count up a count value according to a clock pulse every certain time and to output the count value at a timing instructed by the sampling signal;
an edge polarity determinator configured to determine whether a polarity of the edge of the rectangular wave scale signal is a rising edge or a falling edge and to generate an adjustment signal when the edge, from which the sampling signal is generated, is the falling edge; and
an adjuster configured to add a predetermined adjustment amount to the count value output from the counter when receiving the adjustment signal; and
an average calculation executor configured to calculate an average of k number of sampling values, wherein
the counter synchronizes with a reference signal and is a loop counter in which k/2 periods of the reference signal is a cycle of the count value, the sampling signal generator generates the sampling signal successively k times at the timing of the edge of the rectangular wave scale signal after sampling becomes enabled, the edge polarity determinator generates the adjustment signal after the sampling becomes enabled and when a first edge of the rectangular wave scale signal is the falling edge, and the adjuster adds a value equivalent to 1/k of a cycle of the counter to the count value output from the counter as an adjustment amount, where k is a natural number.

2. The displacement measuring device according to claim 1, wherein a rising edge is replaced with a falling edge, and a falling edge is replaced with a rising edge.

3. A displacement measuring device comprising:

a main scale;

a detection head provided to be relatively displaceable to the main scale and configured to output a periodic signal having a phase to be changed according to relative displacement to the main scale;

a demodulator configured to demodulate the periodic signal into a rectangular wave scale signal having phase information at an edge;

a phase detector configured to detect the phase information of the rectangular wave scale signal at a timing of the edge, wherein the phase detector comprises:

a sampling signal generator configured to generate a sampling signal at the timing of the edge of the rectangular wave scale signal;

a counter configured to count up a count value according to a clock pulse every certain time and to output the count value at a timing instructed by the sampling signal;

an edge polarity determinator configured to determine whether a polarity of the edge of the rectangular wave scale signal is a rising edge or a falling edge and to generate an adjustment signal when the edge, from which the sampling signal is generated, is the falling edge; and an adjuster configured to add a predetermined adjustment amount to the count value output from the counter when receiving the adjustment signal; and an average calculation executor configured to calculate an average of k number of sampling values, wherein the counter synchronizes with a reference signal and is a loop counter in which $(k+\alpha)/2$ periods of the reference signal is a cycle of the count value, the sampling signal generator generates the sampling signal successively k times at the timing of the edge of the rectangular wave scale signal after sampling becomes enabled, the edge polarity determinator generates the adjustment signal after the sampling becomes enabled and when a first edge of the rectangular wave scale signal is the falling edge, and the adjuster adds a value equivalent to $1/(k+\alpha)$ of a cycle of the counter to the count value output from the counter as an adjustment amount, where k and a are natural numbers.

4. The displacement measuring device according to claim 3, wherein a rising edge is replaced with a falling edge, and a falling edge is replaced with a rising edge.

* * * * *